(12) United States Patent
Powell et al.

(10) Patent No.: US 9,516,487 B2
(45) Date of Patent: Dec. 6, 2016

(54) AUTOMATED ACCOUNT PROVISIONING

(71) Applicant: Visa International Service Association, San Francisco, CA (US)

(72) Inventors: Glenn Leon Powell, Fremont, CA (US); John F. Sheets, San Francisco, CA (US); Igor Karpenko, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/546,955

(22) Filed: Nov. 18, 2014

(65) Prior Publication Data
US 2015/0140960 A1 May 21, 2015

Related U.S. Application Data

(60) Provisional application No. 61/906,378, filed on Nov. 19, 2013.

(51) Int. Cl.
*H04W 4/24* (2009.01)
*H04W 4/12* (2009.01)
(Continued)

(52) U.S. Cl.
CPC ............ *H04W 4/24* (2013.01); *G06Q 20/322* (2013.01); *G06Q 20/3229* (2013.01);
(Continued)

(58) Field of Classification Search
CPC ....... H04W 4/24; H04W 4/12; H04W 12/06; H04M 2215/32; H04M 2215/2026; H04M 15/00; H04M 17/00; G06Q 20/105
USPC ............... 455/406, 407, 558; 379/114.01; 725/14.1; 705/41, 71, 44, 39, 72, 35, 705/76, 64; 726/26
See application file for complete search history.

(56) References Cited

U.S. PATENT DOCUMENTS

| 5,613,012 A | 3/1997 | Hoffman et al. |
| 5,781,438 A | 7/1998 | Lee et al. |

(Continued)

FOREIGN PATENT DOCUMENTS

| EP | 2156397 A1 | 2/2010 |
| KR | 10-2007-0021826 A | 2/2007 |

(Continued)

OTHER PUBLICATIONS

International Search Report and Written Opinion mailed Feb. 27, 2015 in PCT/US2014/066215, 13 pages.
(Continued)

*Primary Examiner* — Kamran Afshar
*Assistant Examiner* — Farid Seyedvosoghi
(74) *Attorney, Agent, or Firm* — Kilpatrick Townsend & Stockton LLP

(57) ABSTRACT

Embodiments of the present invention are directed to systems, methods, and apparatus for allowing an issuer to initiate account provisioning on a mobile device without interacting with an accountholder. The issuer may initiate the process by sending a provisioning information request message to a mobile device with a secure element. The mobile device may recognize the provisioning request message and gather the requisite provisioning information without requiring user input. The provisioning information may include information associated with the secure element of the mobile device. The mobile device may then send a provisioning request message to a provisioning system. The provisioning request message may include the requisite provisioning information to allow the provisioning system to provision the financial account on the secure element of the mobile device.

14 Claims, 8 Drawing Sheets

(51) Int. Cl.
  *H04W 12/06* (2009.01)
  *G06Q 20/32* (2012.01)
  *G06Q 20/36* (2012.01)
  *H04L 12/14* (2006.01)
  *H04M 15/00* (2006.01)
  *H04M 17/02* (2006.01)
  *H04W 12/04* (2009.01)

(52) U.S. Cl.
  CPC ..... *G06Q 20/3672* (2013.01); *H04L 12/1457* (2013.01); *H04M 15/48* (2013.01); *H04M 15/755* (2013.01); *H04M 15/7556* (2013.01); *H04M 15/8044* (2013.01); *H04M 17/02* (2013.01); *H04W 4/12* (2013.01); *H04W 12/06* (2013.01); *H04L 12/1464* (2013.01); *H04M 15/75* (2013.01); *H04M 15/751* (2013.01); *H04W 12/04* (2013.01)

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,224,702 B2 | 7/2012 | Mengerink et al. |
| 8,225,385 B2 | 7/2012 | Chow et al. |
| 8,250,662 B1 | 8/2012 | Zhu et al. |
| 8,265,993 B2 | 9/2012 | Chien et al. |
| 8,280,777 B2 | 10/2012 | Mengerink et al. |
| 8,328,095 B2 | 12/2012 | Oder, II et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,478 B2 | 8/2013 | Saunders et al. |

(56) References Cited

U.S. PATENT DOCUMENTS

| | | | |
|---|---|---|---|
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,887,308 B2 | 11/2014 | Grecia |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0082323 A1* | 4/2004 | Smith ............. H04L 12/5895 455/418 |
| 2004/0093281 A1 | 5/2004 | Silverstein et al. |
| 2004/0107366 A1* | 6/2004 | Balfanz ............. H04L 12/1822 726/5 |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0132392 A1 | 5/2009 | Davis et al. |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0154466 A1 | 6/2011 | Harper et al. |
| 2011/0161233 A1 | 6/2011 | Tieken |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0272471 A1 | 11/2011 | Mullen |

(56) References Cited

U.S. PATENT DOCUMENTS

| | | |
|---|---|---|
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0172089 A1 | 7/2012 | Bae et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0254030 A1 | 10/2012 | Khan et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0019098 A1 | 1/2013 | Gupta et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0151400 A1 | 6/2013 | Makhotin et al. |
| 2013/0159178 A1 | 6/2013 | Colon et al. |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212666 A1 | 8/2013 | Mattsson et al. |
| 2013/0218698 A1 | 8/2013 | Moon et al. |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0214655 A1 | 7/2014 | Smith |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong |

FOREIGN PATENT DOCUMENTS

| | | |
|---|---|---|
| KR | 10-2011-0124928 A | 11/2011 |
| KR | 10-2013-0115200 A | 10/2013 |
| WO | 0135304 A1 | 5/2001 |
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |

(56) References Cited

FOREIGN PATENT DOCUMENTS

| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

AUTOMATED ACCOUNT PROVISIONING

CROSS-REFERENCES TO RELATED APPLICATIONS

This application claims benefit under 35 U.S.C. §119(e) to U.S. Provisional Patent Application No. 61/906,378 filed Nov. 19, 2013 and entitled "Issuer Initiated Account Provisioning", the disclosure of which is incorporated by reference herein in their entirety for all purposes.

BACKGROUND

Mobile communication devices are becoming increasingly popular for conducting various types of transactions. A mobile communication device can store financial account information or other information associated with a user, for example, information associated with credit cards, debit cards, coupons, rewards, receipts, concert tickets, and the like. The mobile communication device may be linked to a user's payment account credentials as well as personal information. Using mobile communication devices for payment transactions reduce the need to enter payment credentials or present a physical card each time a payment transaction is conducted. Often, a provisioning system (i.e. a provisioning service provider computer) is required to provision the financial account information of the user on the user's mobile communication device.

Current provisioning systems typically require the users to request provisioning of accounts from the mobile communication device. However, this can be onerous and difficult for some accountholders who are not technically savvy. Furthermore, issuers may wish to provision payment accounts for some customers (e.g., VIPs) or accountholders who indicate an interest in the provisioning while in a branch office. However, issuers do not have access to all of the mobile device information, such as information associated with a secure element of the mobile device, necessary to provision the financial account on the mobile device. In addition, conventional systems require interaction with a third party (e.g. the mobile network operator) to obtain the secure element information. These communications are extensive in nature, and require cooperation between different entities with different data transfer protocols. Accordingly, there is a need for a system that allows an account issuer to initiate a provisioning request on behalf of the user.

Embodiments of the invention address these and other problems, individually and collectively.

SUMMARY

Embodiments of the invention are directed to systems, apparatuses, and methods related to initiating the provisioning of financial accounts on mobile devices by an issuer and without user interaction. Provisioning a financial account on a mobile device includes secure communication of financial account information into a secure element or other secure data storage element of the mobile device. The financial account information or credentials may be accessed by authorized applets or mobile payment applications on the mobile device to initiate and complete transactions with access devices, server computers, and any other components or systems in a transaction processing system.

Embodiments of the present invention allow an issuer to initiate account provisioning on a mobile device without requiring interaction with or input from an accountholder (i.e. user). For example, the issuer may initiate the process by sending a provisioning information request message to a mobile device with a secure element (i.e. secure memory). The operating system of the mobile device may recognize the provisioning request message and gather the requisite provisioning information without requiring user input. The provisioning information may include, for example, information associated with the secure element of the mobile device. The mobile device may then send a provisioning request message to a provisioning system (i.e. provisioning service provider computer). In some exemplary embodiments, the mobile device may send the provisioning request message to the issuer, which may, in turn, send the provisioning request message to the provisioning system. The provisioning request message may include the requisite provisioning information to allow the provisioning system to provision the financial account on the secure element of the mobile device.

In some embodiments, the issuer may include an authorization code in the provisioning information request message. The authorization code may be forwarded to the provisioning system as part of the provisioning request message. The provisioning system may validate the authorization code to ensure the mobile device is authorized by the issuer for provisioning of the account.

One embodiment of the invention is directed to a method comprising receiving, by a mobile communication device, an information request message from an issuer server computer. The mobile communication device automatically determines provisioning information associated with a secure memory in response to the information request message and without input of a user operating the mobile communication device. The method further includes generating, by the mobile communication device, a provisioning request message including the provisioning information. The mobile communication device sends the provisioning request message including the provisioning information to a provisioning system or the issuer server computer and receives a provisioning response message including provisioning data from the provisioning system. The provisioning data is generated using the provisioning information associated with the secure memory. The method also includes storing, by the mobile communication device, the provisioning data in the secure memory. The provisioning data associates the mobile communication device with a payment account.

Another embodiment of the invention is directed to a method comprising authenticating, by an issuer server computer, a user associated with a user payment account. The issuer server computer receives a mobile device identifier identifying a mobile device of the user and generates a provisioning information request message without interacting with the user. The provisioning information request message includes at least the mobile device identifier and a provisioning information request identifier. The provisioning information request identifier automatically causes the mobile device to gather provisioning information. The method further includes sending, by the issuer server computer, the provisioning information request message to the mobile device of the user. The provisioning information request message initiates provisioning of the user payment account on the mobile device of the user.

Yet another embodiment of the invention is directed to an issuer computer server computer comprising a processor and a non-transitory computer readable medium coupled to the processor. The computer readable medium comprises code, that when executed by the processor, causes the processor to send an information request message to a mobile communication device. The information request message requests provisioning information associated with a secure memory of the mobile communication device. The code, when executed by the processor, further causes the processor to receive a response message including the provisioning information from the mobile communication device. The provisioning information is automatically gathered by the mobile communication device in response to the information request message and without input of a user operating the mobile communication device. The code, when executed by the processor, further causes the processor to send a provisioning request message to a provisioning system such that provisioning data can be sent to the mobile communication device for associating the mobile communication device with a payment account. The provisioning request message includes the provisioning information, and one or more of an account identifier and a mobile device identifier associated with the mobile communication device. In certain embodiments, the code, when executed by the processor, causes the processor to generate an authorization code indicating that the provisioning request message associated with the authorization code is authorized and authenticated by the issuer server computer, and include the authorization code in the provisioning request message.

Other embodiments include a mobile communication device comprising a processor, a server computer comprising a processor and computer readable media configured to complete the methods described above. Further, other embodiments may include systems, server computers, and methods for completing the functionality disclosed herein.

These and other embodiments of the invention are described in further detail below.

DETAILED DESCRIPTION

Figure 1:
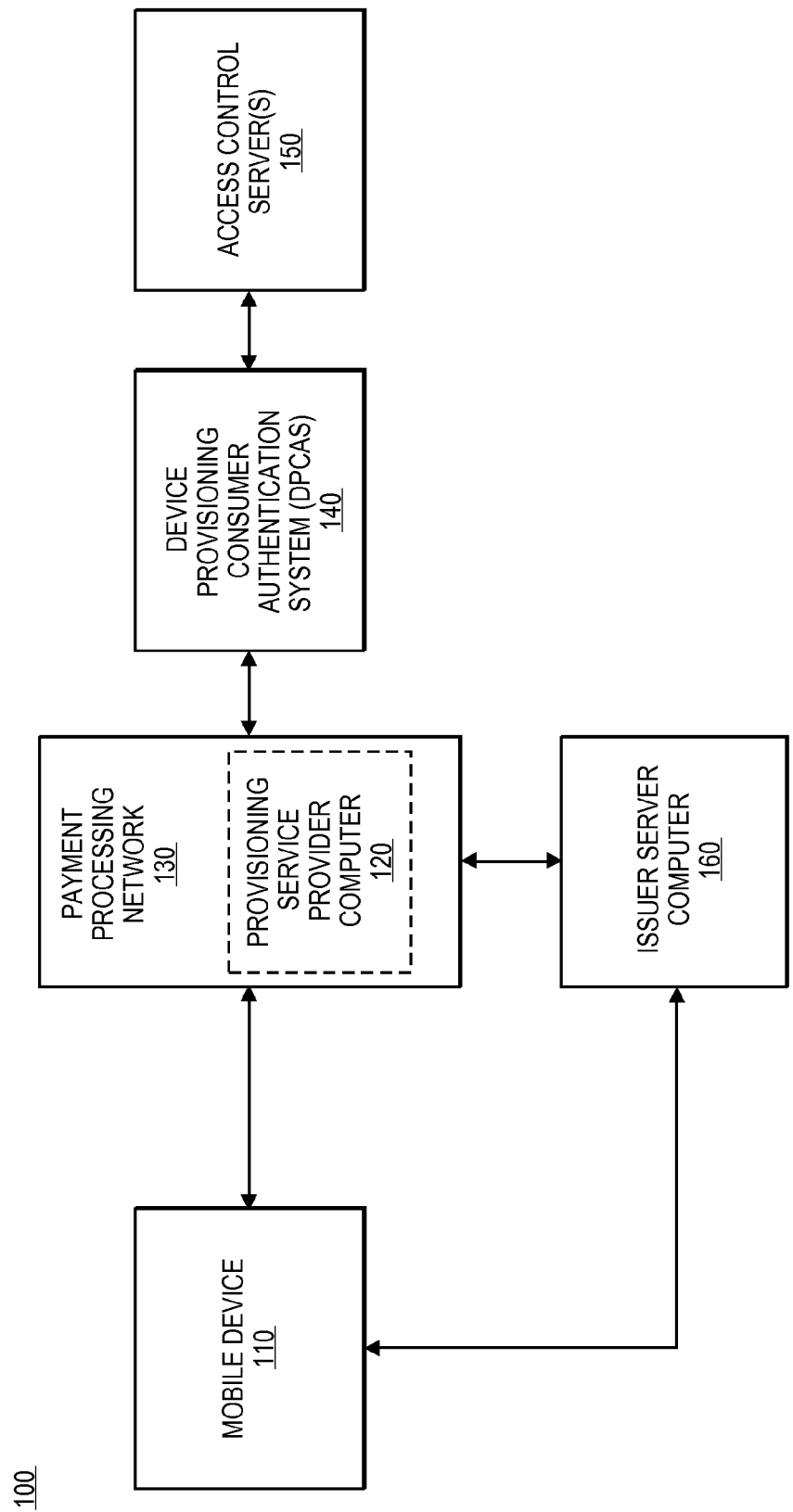
FIG. 1 shows a block diagram of an exemplary secure element account provisioning system, according to an embodiment of the invention.

Embodiments of the present invention allow an issuer to initiate account provisioning on a mobile device without interaction with or input from a user. For example, the issuer may initiate the process by sending a provisioning information request message to a mobile device with a secure element (i.e. secure memory). The operating system of mobile device may recognize the provisioning request message and gather the requisite provisioning information without requiring user input. The provisioning information may include, for example, information associated with the secure element of the mobile device. The mobile device may then send a provisioning request message to a provisioning system. In some exemplary embodiments, the mobile device may send the provisioning request message to the issuer, which may, in turn, send the provisioning request message to the provisioning system. The provisioning request message may include the requisite provisioning information to allow the provisioning system to provision the financial account on the secure element of the mobile device.

In some embodiments, the issuer may include an authorization code in the provisioning information request message. The authorization code may be forwarded to the provisioning system as part of the provisioning request message. The provisioning system may validate the authorization code to ensure the mobile device is authorized for provisioning of the account.

Thus, embodiments of the present invention may be used in connection with transaction processing systems or may use data generated during transaction processing through a transaction processing system. Such embodiments may involve transactions between accountholders and merchants using the mobile communication device of the accountholders. For example, once an account has been successfully provisioned onto the secure element of the mobile communication device of the accountholder (i.e. user), the accountholder may use the provisioned account information to initiate and complete transactions with transaction processing systems, as further described below in connection with FIG. 7.

Before discussing specific embodiments and examples, some descriptions of terms used herein are provided below.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise secured hardware or software component within the mobile device and/or one or more external components that may be coupled to the mobile device. A detailed description of an exemplary mobile device is provided below.

A "secure element" may include any secure memory device such that the data contained on the secure element cannot easily be hacked, cracked, or obtained by an unauthorized entity. For example, the secure element may be an integrated circuit device that is implemented within a near field communications (NFC) enabled mobile communication device. The secure element may contain embedded smart card-grade applications (e.g., payment, transport, etc.). The secure element may be used by the mobile communication device to host and store data and applications that require a high degree of security. For example, the secure element may be encrypted and may store payment account information. The secure element may be provided to the mobile communication device by the secure element owner, who may also be the mobile network operator (MNO), original equipment manufacturer (OEM), mobile device manufacturer (MDM), or any other suitable entity. Additionally, the secure element may be either embedded in the handset of the mobile communication device or in a subscriber identity module (SIM) card that may be removable from the mobile communication device. The secure element can also be included in an add-on device such as a micro-Secure Digital (microSD) card or the like.

An "issuer" may typically refer to a business entity (e.g., a bank) that maintains financial accounts for a user and often issues a credit or debit card to the user. An issuer can include a payment account issuer or other service provider that provisions and personalizes mobile payment applications on a secure element of a mobile device. During provisioning, issuers (and issuer trusted service managers) may ensure that the mobile device is properly configured to allow accountholder purchases using mobile payment applications on the secure element. The issuer may be responsible to make a credit limit available to account holders and may also be responsible for sending payments to merchants for purchases made with payment accounts issued by the issuer.

As used herein, a "payment account" or a "financial account" (which may be associated with one or more payment devices) may include any suitable payment account including a credit card account, a checking account, a savings account, a merchant account assigned to a accountholder, or a prepaid account.

A "server computer" or a "server" can be a powerful computer or a cluster of computers. For example, the server computer can be a large mainframe, a minicomputer cluster, or a group of servers functioning as a unit. In one example, the server computer may be a database server coupled to a Web server.

As used herein, "provisioning information" may include information specific to a memory (e.g., a secure element) of a mobile device that is used by a provisioning system to provision payment account credentials on the mobile device. For example, the provisioning information may include algorithms and/or encryption keys stored by the secure element, a secure element identifier assigned to the secure element, information associated with a secure domain of the secure element, network operator information, user information, trusted service manager information, etc.

As used herein, "provisioning request message" may include a message sent from a mobile device directly or indirectly to a provisioning system to request provisioning of payment account credentials on the mobile device. The payment account credentials associate the mobile device with a payment account, thereby enabling the mobile device to initiate payment transactions. The provisioning request message may include provisioning information that would enable the provisioning system to provision payment account credentials on the mobile device.

As used herein, "provisioning data" may include information that is configured to be installed on a device to allow the device to perform a service or set of functionality. In some embodiments, the provisioning data may be installed on a memory of a device. Further, in some embodiments, the memory may include a secure memory (e.g., a secure element). For example, provisioning data may include data that has been encrypted with a secure element key that may allow a secure element or other secure data to receive and install the data. Alternatively or additionally, the provisioning data may include data that is ready to be provisioned to the secure element. For example, the provisioning data may include application data and a secure element key that may allow a mobile application on the device or the secure element to install or store the application data onto the secure element.

As used herein, "provisioning response message" may be message sent from a provisioning system to a mobile device to enable provisioning of payment account credentials on the mobile device. The payment account credentials associate the mobile device with a payment account, thereby enabling the mobile device to initiate payment transactions. The provisioning response message may include provisioning data that would enable the mobile device to install the or store the payment account credentials on the secure element.

I. Issuer-Initiated Secure Element Account Provisioning

Embodiments of the present invention allow an issuer to initiate account provisioning on a secure element of a mobile device without interacting with a user. FIG. 1 shows a block diagram of an exemplary secure element account provisioning system 100 that may be used in connection with issuer-initiated secure element account provisioning described herein. The secure element account provisioning system 100 may include, among other elements, a mobile device 110 (also referred to as a "mobile communication device"), a payment processing network 130 associated with a provisioning service provider computer 120, a device provisioning accountholder authentication system (DPCAS) 140, one or more access control servers 150, and an issuer server computer 160. The entities may comprise any suitable hardware or software, for example such as those illustrated in FIG. 8, and may communicate with one another through any series of communications networks.

Figure 7:
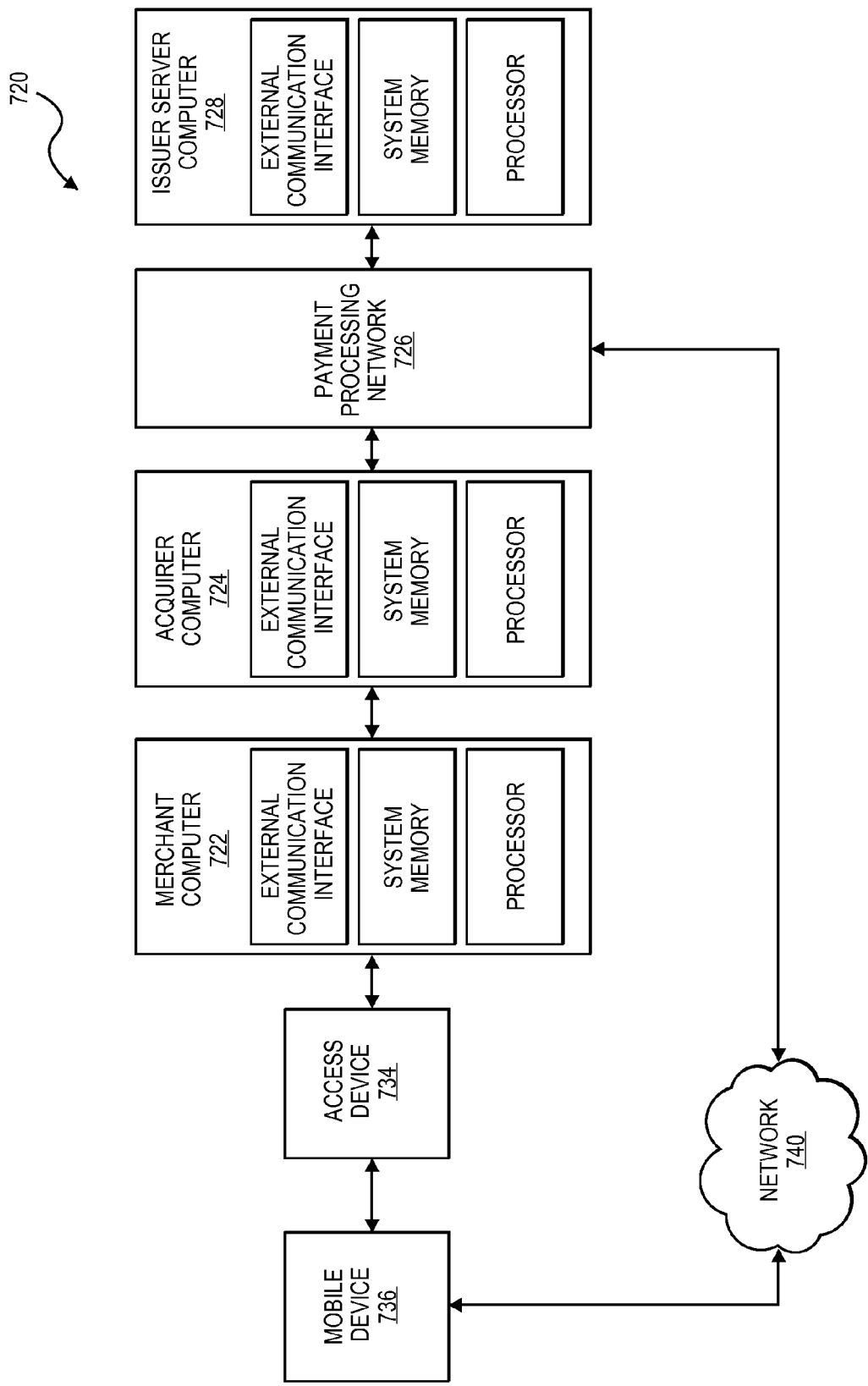
FIG. 7 shows an exemplary financial transaction system, according to an embodiment of the invention.

The mobile device 110 may include any electronic device comprising a secure element or other secure data storage memory that is configured to receive and store secure data. For example, the mobile device 110 may include a smart phone, a tablet device, a smartcard, a cellular phone, or any other device that may be portable, configured to communicate with one or more entities within the transaction processing system (as shown in FIG. 7) as well as the secure element account provisioning system 100, and may be configured to store secure payment credentials for initiating and conducting payment transactions.

The wallet provider server 120 may include any server computer that may manage, facilitate, and otherwise interact with the mobile device 110 as well as any mobile wallets provided on the mobile device 110, and the payment processing network 130 in order to manage the use and maintenance of a wallet system. For example, the wallet provider server 120 may comprise a secure element trusted service manager (SE TSM) for devices associated with the wallet provider server 120.

The payment processing network 130 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network 130 may include a server computer and may use any suitable wired or wireless telecommunications network, including the Internet.

The payment processing network 130 may include or be associated with a provisioning service provider computer 120 (also referred to as a "provisioning system"). The provisioning service provider computer 120 may include any number of systems that may allow the payment processing network 130 to provide provisioning services to merchants, accountholders, mobile devices, etc. The payment processing network 130 and the provisioning service provider computer 120 may provision a financial account on the mobile device 110 upon, for example, the issuer server computer 160 initiating the provisioning of the financial account via communication with the mobile device 110.

The device provisioning accountholder authentication system (DPCAS) 140 may include any computer or series of computers configured to determine the appropriate authentication system to be implemented for authenticating a provisioning request. According to various embodiments, the provisioning request may be sent by the mobile device 110 in response to a provisioning initiating message sent from the issuer server computer 160 to the mobile device 110. The DPCAS 140 may be configured to return a response to the payment processing network 130 indicating that a provisioning request is approved, declined, or that the authentication server is not sure whether the accountholder is authentic and would like to perform further authentication processes to be sure.

The DPCAS 140 may be in communication with one or more access control servers 150 to authenticate the accountholder. The one or more access control servers may include any number of different authentication systems that may be operated by the payment processing network 130, the issuer server computer 160, the wallet provider server 120, or any other third party. The different authentication systems that may be implemented may include on-behalf-of (OBO) issuer authentication system, existing accountholder authentication system, or an authentication system that uses the issuer's access control server (ACS).

The on-behalf-of Issuer authentication service (OBO AS) server may be implemented by the payment processing network 130 and may provide risk-based authentication, using device activation specific rules. These rules may or may not be issuer-specific, and may be used for issuers that do not have an approved ACS for device activation authentication requests.

The accountholder authentication system may be implemented from authentication services related to issuer issued accounts (e.g., Verified by Visa (VbV)) payment authentication requests. The accountholder authentication system can allow issuers to specify customized rules for the authentication of accountholders.

The ACS 150 may be implemented such that the payment processing network 130 may establish new specifications that may be required for the ACS 150 to support device activation authentication requests. An ACS 150 may be selected by the issuer server computer 160 for performing the device activation authentication function.

Figure 2:
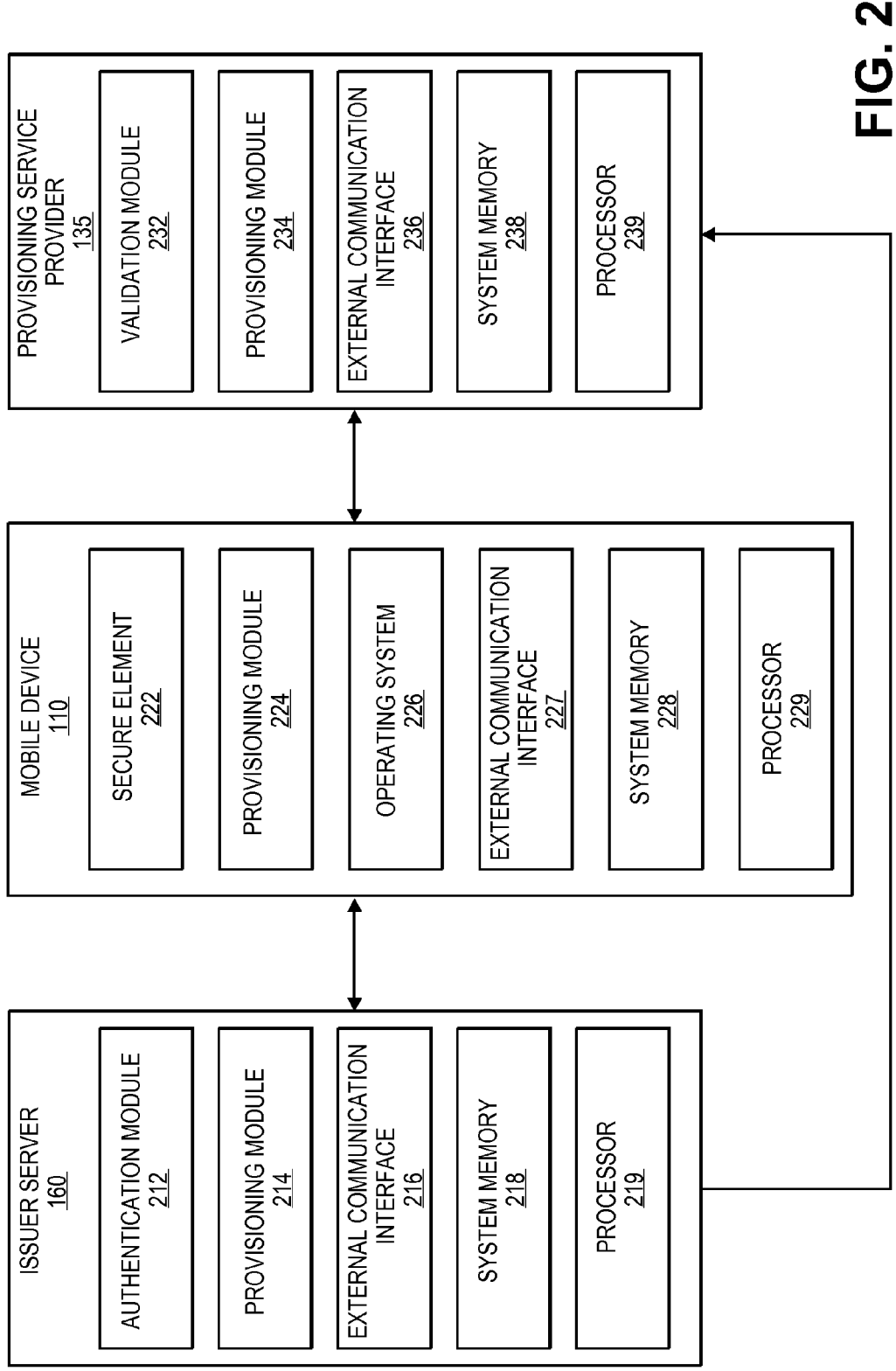
FIG. 2 shows components of, and interactions between, an issuer, a mobile device and a provisioning system for provisioning a financial account on a secure element of the mobile device, according to an embodiment of the invention.
Figure 3:
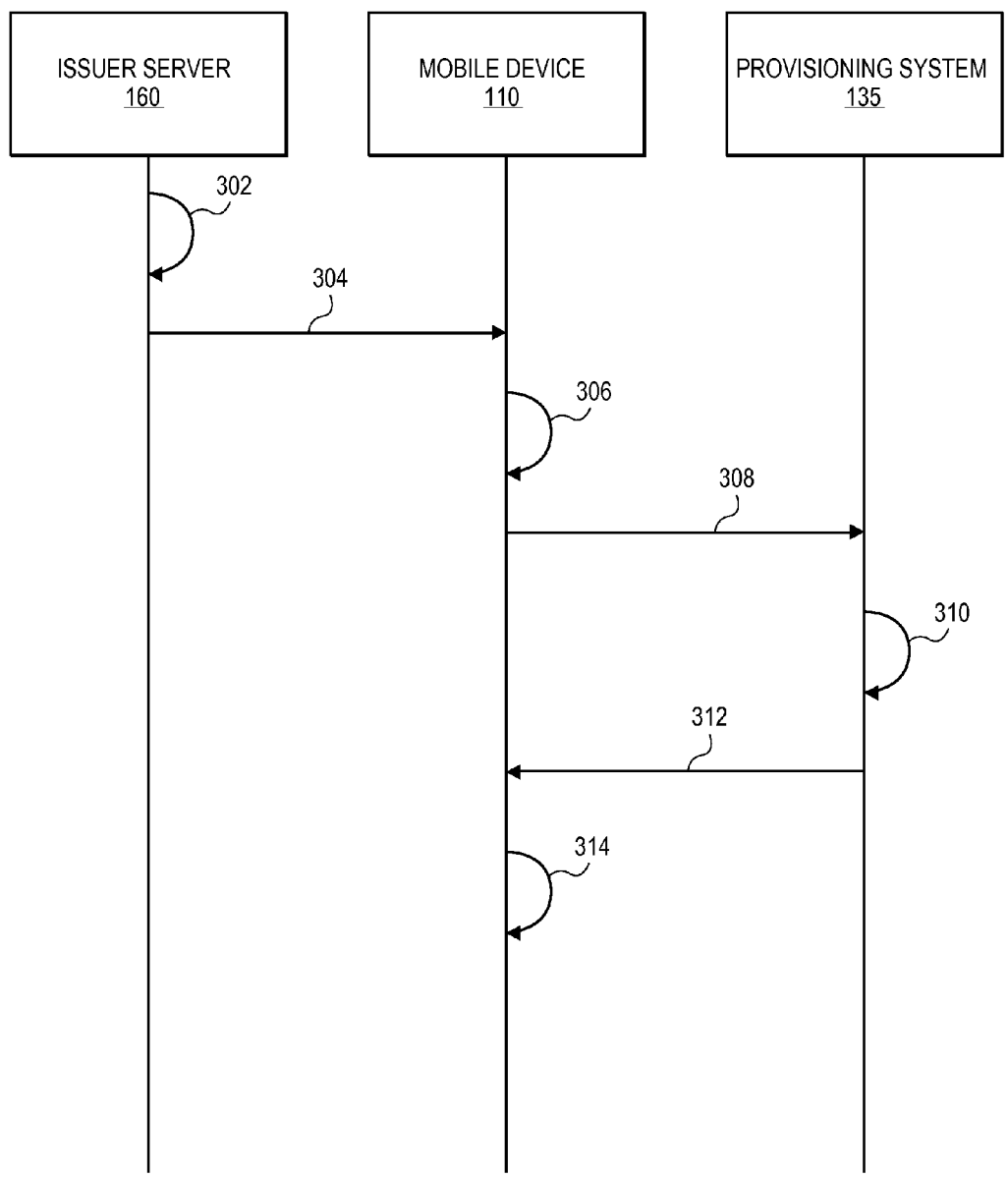
FIG. 3 shows an exemplary flow diagram for an issuer initiated account provisioning process where provisioning information is sent directly from a mobile device to a provisioning system, according to an embodiment of the present invention.
Figure 4:
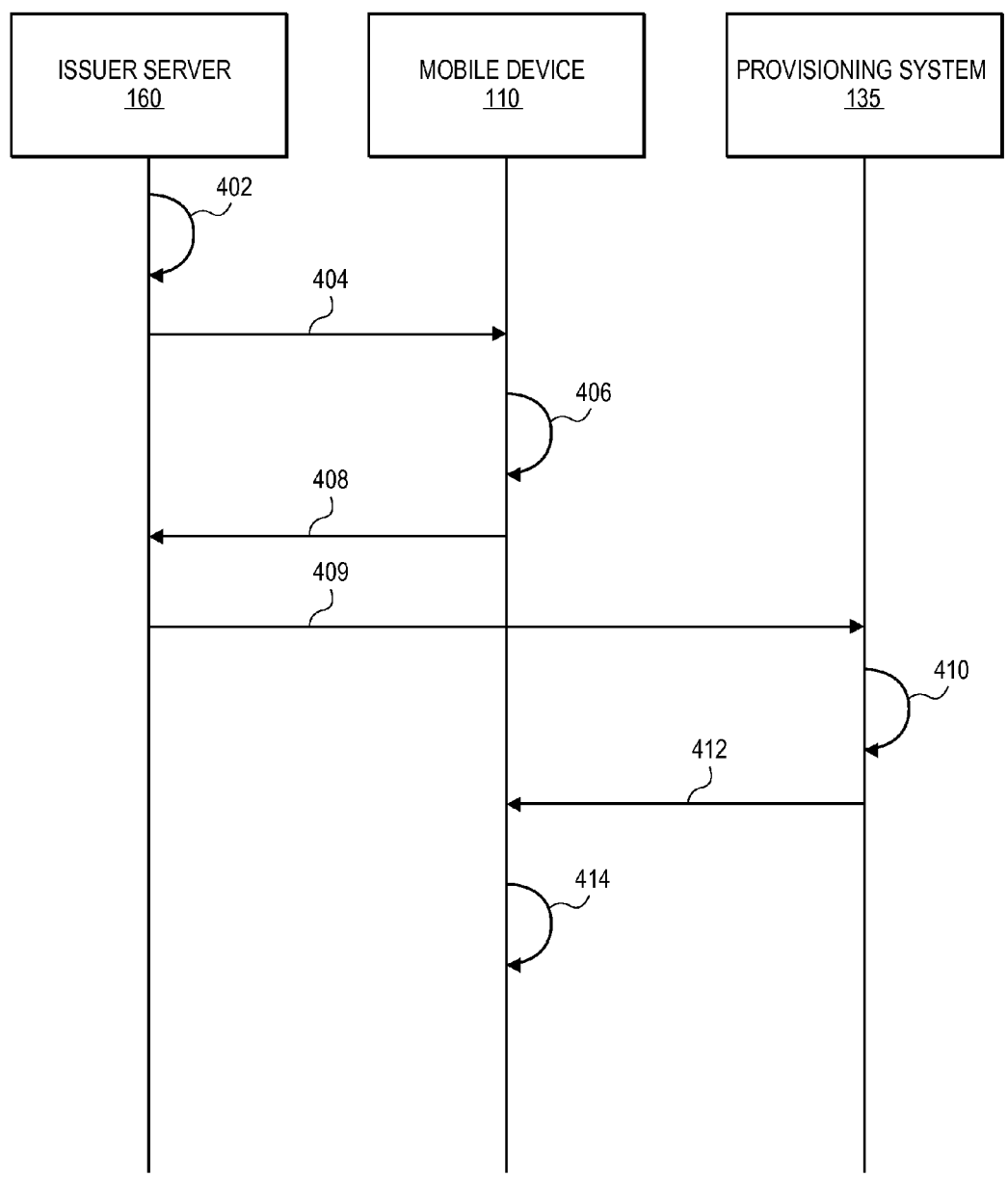
FIG. 4 shows another exemplary flow diagram for an issuer initiated account provisioning process where provisioning information is sent indirectly from a mobile device to a provisioning system, according to an embodiment of the present invention.

Elements of the secure element account provisioning system 100 may interact to provision a financial account (e.g. a payment account) on the secure element of the mobile device 110. FIG. 2 shows the interactions between the issuer server computer 160, the mobile device 110 and the provisioning service provider computer 120 for provisioning the financial account on the secure element of the mobile device 110, according to an embodiment of the invention. The actions of the elements illustrated in FIG. 2 are illustrated in greater detail in FIGS. 3 and 4. Specifically, FIG. 3 shows an exemplary flow diagram for an issuer initiated account provisioning process and FIG. 4 shows another exemplary flow diagram for an issuer initiated account provisioning process, according to embodiments of the present invention. Accordingly, method steps illustrated in FIGS. 3 and 4 are discussed below in connection with FIG. 2.

Before the exemplary method shown in FIG. 2 may be initiated, the issuer server computer 160 may engage in some transaction or otherwise communicate with an accountholder or someone who has authorization to provide a mobile device identifier to the issuer server computer 160 on behalf of the accountholder. The issuer server computer 160 may receive an identifier for a mobile communication device that allows the issuer server computer 160 to identify and communicate with the mobile device 110 associated with the requested account. The mobile device identifier may include one or more of a telephone number, a unique device number, such as an international mobile station equipment identity (IMEI) number, a unique serial number (i.e. integrated circuit card identifier (ICCI)) of a subscriber identification module (SIM) card, and a unique international mobile subscriber identity (IMSI) identifier. In some embodiments, the accountholder (e.g. the user) may register their mobile device identifier with the issuer server computer 160 at any time (i.e. irrespective of, and unrelated to, the provisioning of a payment account). The accountholder may perform any other suitable steps to inform the issuer server computer 160 of their mobile communication device identifier. For instance, an authorized person that is not the accountholder (e.g., a spouse) may inform a teller at the bank that their spouse may wish to have their account provisioned on their device and may provide a mobile device identifier to allow the issuer server computer 160 to contact the mobile device 110.

According to various embodiments, the mobile device 110 may be used to conduct transactions using the accountholder's financial account. In order to do so, the account is provisioned on the mobile device 110. Embodiments of the present application allow the issuer server computer 160 to initiate the provisioning process without any interaction with or input from the accountholder. For example, an executive of the issuer, a customer service representative, a business unit manager or other entity may determine that the financial account is part of a determined accountholder base that should have their account credentials provisioned onto their mobile devices. Based on that determination, the issuer server computer 160 may initiate the provisioning of the financial account on the mobile device 110.

The issuer server computer 160 may include, among other elements, a provisioning module 212. The provisioning module 212 may generate a provisioning information request message (step 302 of FIG. 3 and step 402 of FIG. 4). The provisioning information request message may include one or more of a provisioning information request message identifier (e.g., a header, a flag, a particular formatting, or any information that allows the mobile device 110 to identify the message as a provisioning information request message), an account identifier (e.g., a primary account number (PAN), a PAN substitute, a payment token, a pseudo-PAN, or any other credential associated with the accountholder's account), additional account credentials (e.g., CVV, track 2 data, etc.), an authorization code, and a mobile device identifier (e.g., a phone number, SMS text address, an IP address, a MSISDN, or any other information that may be used to identify and contact the mobile device 110 to be provisioned). The mobile device identifier may also include a unique device number, such as an international mobile station equipment identity (IMEI) number, a unique serial number (i.e. integrated circuit card identifier (ICCI)) of a subscriber identification module (SIM) card, or a unique international mobile subscriber identity (IMSI). The issuer server computer 160 may send the provisioning information request message to the mobile device 110 via, for example, an external communication interface 216 (step 304 of FIG. 3 and step 404 of FIG. 4).

The authorization code in the provisioning information request message may be a re-creatable code that the provisioning service provider computer may use to validate that the provisioning request is authorized and authenticated by, for example, the issuer server computer 160.

According to various embodiments, the issuer server computer 160 may include an authentication module 212 that authenticates the accountholder prior to generating the provisioning information request message using the provisioning module 214. Upon authenticating the accountholder, the authentication module 212 may generate the authorization code which may be used by the provisioning service provider computer 120 to validate that the provisioning request is authorized and authenticated by the issuer server computer 160. The issuer server computer 160 may also include a system memory 218 and a processor 219 to perform one or more of the actions described herein. An exemplary memory and processor is discussed below in connection with FIG. 8.

The mobile device 110 illustrated in FIG. 2 may include a secure element 222 that may securely store account credentials to allow the user of the mobile device 110 to securely initiate and process transactions from the mobile device 110 with NFC point-of-sale devices or through e-commerce merchant servers, etc. When the mobile device 110 receives the provisioning information request message from the issuer server computer 160, the operating system 226 of the mobile device 110 may identify the provisioning information request message indicator included in the provisioning information request message. The identification may occur through any suitable method. For example, the operating system 226 may comprise an identification module that is configured to allow the operating system 226 to identify the provisioning information request message identifier (e.g. a header, a flag, some specific pre-determined message string or content, the specific address of the issuer server computer 160 that sends the provisioning information request message, or any other associated information) indicating that the received message is a provisioning information request message.

In response to the provisioning information request message, the operating system 226 may gather provisioning information associated with the secure element 222. For example, the operating system 226 may request secure domain information from the secure element 222 for an available domain on the secure element 222. In addition, the operating system 226 may gather or determine accountholder information associated with the mobile device 110, network operator information stored on a system memory 228, trusted service manager (TSM) information, unique derived key (UDK) or other encryption key information, and any other information that may be useful for a provisioning system to provision an account on the secure element 222 of the mobile device 110. Accordingly, the provisioning information may include any data (e.g., secure element identifier, UDK identifier, etc.) that may be provided by the mobile device 110 during a request to provision an account on the mobile device 110. Additional details regarding the provisioning information as well as the other information provided during provisioning requests may be found in U.S. patent application Ser. No. 13/713,938, filed Dec. 13, 2012, by Makhotin, et al., which is hereby incorporated by reference in its entirety for all purposes.

After the operating system 226 gathers the provisioning information, the provisioning module 224 of the mobile device 110 may generate a provisioning request message including the provisioning information (step 306 of FIG. 3 and step 406 of FIG. 4). The provisioning request message may also include one or more of the authorization code, the account identifier, the additional account credentials and the mobile device identifier provided to the mobile device 110 by the issuer server computer 160. The mobile device 110 may send the provisioning request message to the provisioning service provider computer 120 via the external communication interface 227 (step 308 of FIG. 3). The mobile device 110 may also include a processor 229 to perform one or more of the actions described herein. An exemplary processor is discussed below in connection with FIG. 8.

In some embodiments, the mobile device 110 may send the provisioning request message or just the provisioning information to the issuer server computer 160 in response to the provisioning information request message (step 408 of FIG. 4). The issuer server computer 160 may then send the provisioning information along with one or more of the authorization code, the account identifier, the additional account credentials and the mobile device identifier to the provisioning server provider 120 via the external communication interface 216 (step 409 of FIG. 4).

According to various embodiments, the provisioning service provider computer 120 may be located in the payment processing network 130 illustrated in FIG. 1 or may include a separate third party provisioning system such as a TSM associated with the mobile network operator, mobile device manufacturer, the issuer server computer 160, or any other third party, or any combination thereof. The provisioning service provider computer 120 may be configured to receive the provisioning request message from the mobile device 110 or the issuer server computer 160 and complete the provisioning process. Any suitable combination of components or systems that are configured to provision the requested account onto the secure element 222 of the mobile device 110 may be included in the provisioning service provider computer 120.

Upon receiving the provisioning request message, the provisioning service provider computer 120 may authenticate the accountholder information using a validation module 232 (step 310 of FIG. 3 and step 410 of FIG. 4). For example, the validation module 232 may validate the authorization code generated by the authentication module 212 of the issuer server computer 160 to ensure that the mobile device 110 is authorized by the issuer server computer 160 to be provisioned. In some embodiments, the DPCAS 140 and ACS controllers 150 shown in FIG. 1 may be used to implement an advanced authentication of the accountholder. If the validation module 232 determines that the authorization code, the account identifier or the additional account credentials do not match with the information stored and/or accessed by the provisioning service provider computer 120, the provisioning process may be terminated. Similarly, if some risk data at the provisioning service provider computer 120 requires advanced authentication of the accountholder, the provisioning process may be paused or terminated. Details regarding the advanced authentication process and other exemplary methods of provisioning account data onto a mobile communication device may be found in U.S. patent application Ser. No. 14/455,600, filed Aug. 8, 2014, by Karpenko, et al., which is hereby incorporated by reference in its entirety for all purposes.

The generation of and subsequent validation of the authentication code may occur in any suitable manner. For example, an authentication code may be generated by the authentication module in the issuer server using a number of data inputs and a hashing algorithm to obtain the authorization code. The validation module of the provisioning service provider computer can then create the authentication code using the data inputs. Such data inputs may be associated with the transaction or the account. Exemplary data inputs may include an account number, a CVV, home address, date, time, phone identifier information such as a SIM card number, IMEI number, etc., and name, as well as other data elements in this application. In another example, the issuer server and the provisioning service provider computer may share a secret encryption key. The issuer server may concatenate and encrypt data inputs such as those above using the encryption key and an encryption algorithm to form the authentication code. The authentication code could be decrypted by the provisioning service provider computer using the secret encryption key and the associated encryption algorithm.

If the provided information is validated by the validation module 232, the provisioning service provider computer 120 may provision the accountholder's payment account on the secure element 222 of the mobile device 110 (step 312 of FIG. 3 and step 412 of FIG. 4). For example, the provisioning service provider computer 120 may send a provisioning response message to the mobile device 110 via an external communication interface 236. The provisioning response message may provision the accountholder's payment account on the secure element 222 of the mobile device 110 (step 314 of FIG. 3 and step 414 of FIG. 4). As illustrated in FIG. 2, the provisioning service provider computer 120 may also include a system memory 238 and a processor 239 to perform one or more of the actions described herein. An exemplary memory and processor is discussed below in connection with FIG. 8.

Additional details regarding some potential implementations of the provisioning service provider computer 120 and details of the provision information, provisioning data, encryption steps, and key management can be found in U.S. patent application Ser. No. 13/713,938, filed Dec. 13, 2012, by Makhotin, et al., which is hereby incorporated by reference in its entirety for all purposes.

II. Exemplary Methods

Figure 5:
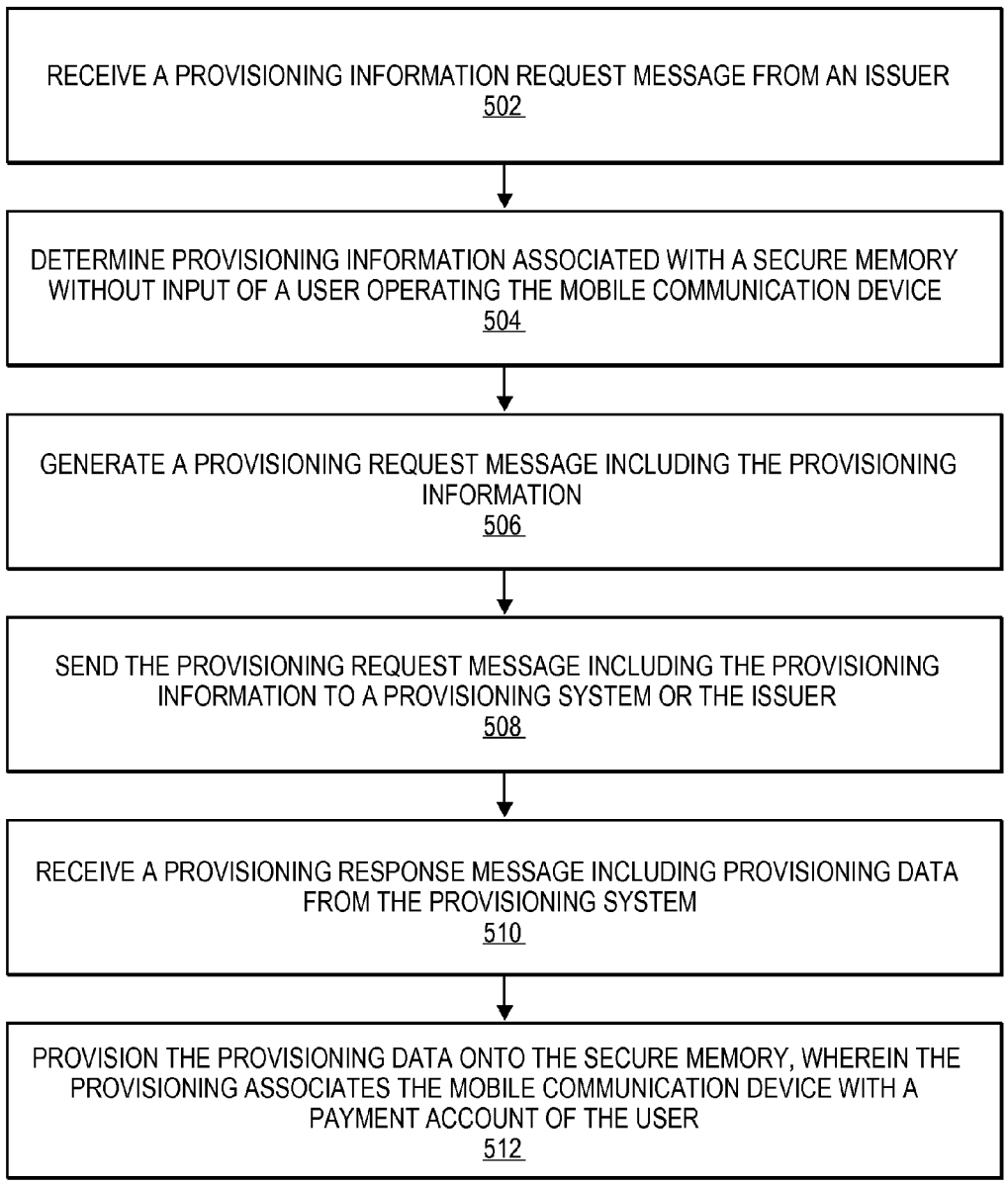
FIG. 5 shows exemplary steps performed by a mobile device for provisioning a financial account on a secure element of the mobile device, according to an embodiment of the invention.

FIG. 5 shows an exemplary method 500 performed by a mobile device for provisioning a financial account on a secure element of the mobile device, according to an embodiment of the invention. At 502, the mobile device comprising the secure element receives a provisioning information request message from an issuer. In some embodiments, the provisioning information request message may be encrypted with an issuer provisioning service key or other shared encryption key pair to ensure that the provisioning information request message may not be intercepted by a malicious third party. If the message is encrypted, the mobile device may decrypt the message upon receipt. The provisioning information request message may include one or more of an authorization code, an account identifier and a mobile device identifier. The mobile device may receive the provisioning information request message using any communication network or communication protocol. For example, the provisioning information request message may include a text message, an email, an over-the-air (OTA) communication message, or any other message that the mobile device may receive. In some embodiments, the provisioning information request message may include an identifier. An operating system of the mobile device may identify that the received message is a provisioning information request message based on the identifier and without the user (or the accountholder) having to identify the message as such. According to various embodiments, the mobile device may not even display the provisioning information request message to the user.

Once the mobile device identifies the provisioning information request message, the operating system of the mobile communication device may gather or determine provisioning information associated with the secure element and the mobile communication device without the input of the user operating the mobile device (step 504). At step 506, the mobile device generates a provisioning request message including the gathered/determined provisioning information. The provisioning request message may also include one or more of the authorization code, the account identifier and a mobile communication device identifier (e.g., phone number, MSISDN, etc.) that may allow a provisioning system to determine the appropriate mobile communication device and the associated secure element on which to provision the account credentials. Further, the provisioning request message may be encrypted with an encryption service key to ensure that the provisioning request may not be intercepted by a malicious third party.

At step 507, the mobile device may send the provisioning request message to the issuer or to a provisioning system (i.e. provisioning service provider computer). If the provisioning request message is sent to the issuer in response to the provisioning information request message, the issuer may send the provisioning request message to the provisioning system.

When the provisioning system receives the provisioning request message including the authorization code, the provisioning information, and the accountholder account credentials (e.g., PAN, payment token, CVV, any other track 1 or track 2 data associated with the payment account, etc.), the provisioning system may validate the authorization code to ensure the mobile device is authorized to be provisioned by the issuer. The validation of the authorization code may be completed in any suitable manner. For example, in some embodiments, the provisioning system and the issuer server computer may share a unique secret key or secret algorithm that allows the provisioning system to generate another authorization code and compare the received authorization code to the generated authorization code to ensure they are the same and thus, that the authorization code must have come from the issuer server computer as the issuer is the other party that knows the unique secret key or secret algorithm. Alternatively, the provisioning system may contact the issuer server computer to obtain authorization and/or validate the authorization code is associated with the mobile device requesting the account provisioning. Any other suitable validation technique may be implemented to allow the provisioning system to ensure that the provisioning request message is associated with the correct account, the correct mobile device, and that the issuer server computer has requested or initiated the account provisioning.

Once the authorization code has been validated to confirm that the mobile device is authorized to have the payment account credentials provisioned onto the secure element of the mobile device, the provisioning system uses the received provisioning information, mobile communication device identifier, account credentials, and any other information associated with the request to generate a provisioning response message including account provisioning data. The account provisioning data may be traditional provisioning data that one of ordinary skill in the art may recognize. The provisioning system may send the provisioning response message to the mobile device.

At step 510, the mobile device may receive the provisioning response message including the provisioning data. In some embodiments, the account provisioning data may be generated using a unique derived key (UDK) or other encryption key that is associated with a mobile payment application stored on the secure element such that the secure element or the mobile payment application may decrypt the account provisioning data and store the account provisioning data onto the secure element. One or more software modules or applets on the mobile device and/or the secure element may identify the provisioning data as being a provisioning response directed at the secure element and may operate to provision the provisioning data onto the secure element. Accordingly, the secure element may now comprise the payment account credentials associated with the payment account and may be configured to initiate and complete transactions using an NFC communications chip, e-commerce transactions, or any other secure payment processes from the mobile device.

Accordingly, the payment account that may be used in a payment transaction is provisioned on the mobile device without any user input, knowledge, or affirmative action by the mobile device operator. In some embodiments, the accountholder or mobile communication device operator may be notified as to the status of the process or that the process is being completed, but such notification is optional and in other embodiments, no such notification may be given. Embodiments of the present invention enable an issuer to automatically and seamlessly provision a payment account onto an authorized mobile device.

Figure 6:
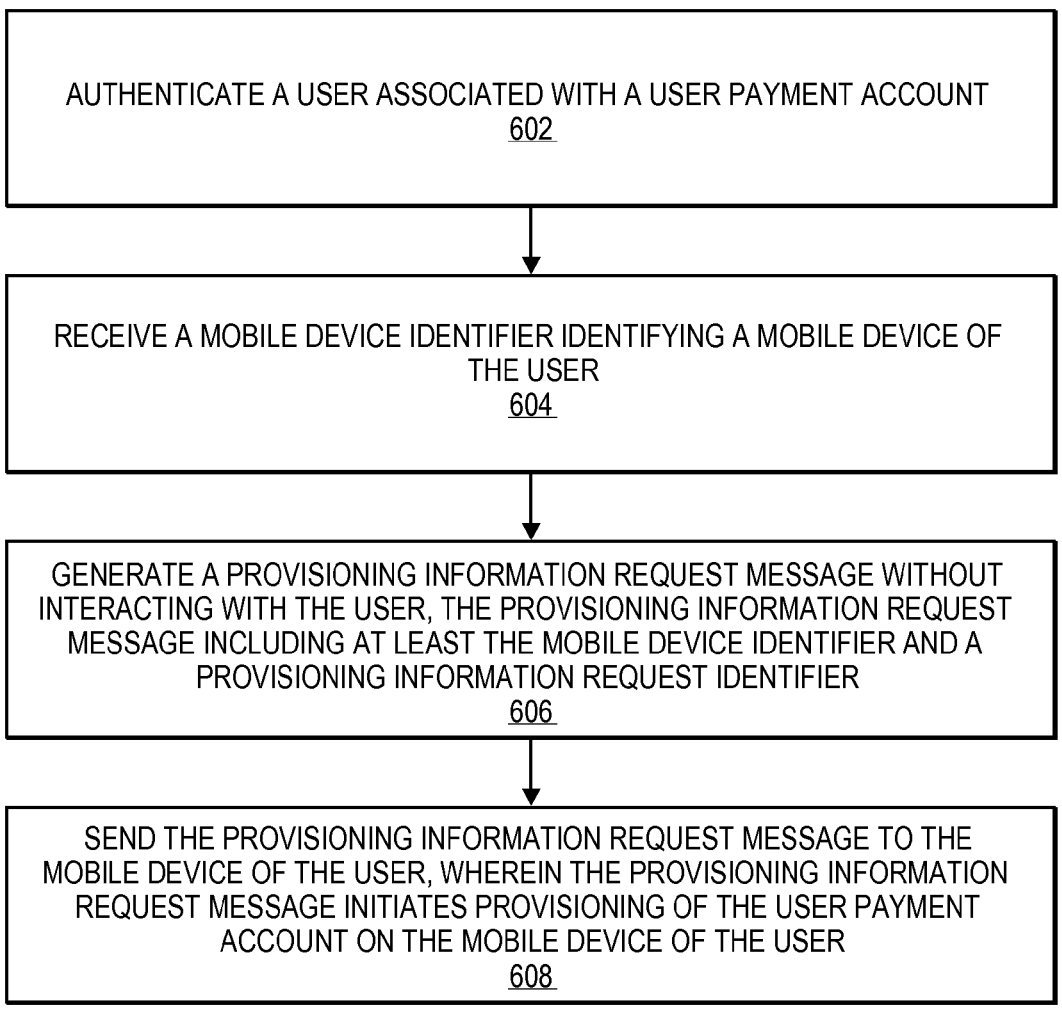
FIG. 6 shows exemplary steps performed by an issuer for initiating the provisioning of a financial account on a mobile device, according to an embodiment of the invention.

FIG. 6 shows exemplary steps performed by the issuer for initiating the provisioning of a financial account on a mobile device, according to an embodiment of the invention. At step 602, the issuer authenticates a user associated with a user payment account. At step 604, the issuer may receive a mobile device identifier associated with a mobile device of the user. As provided above, the mobile device identifier may include one or more of a telephone number, a unique device number, such as an international mobile station equipment identity (IMEI) number, a unique serial number (i.e. integrated circuit card identifier (ICCI)) of a subscriber identification module (SIM) card, and a unique international mobile subscriber identity (IMSI) identifier.

The issuer may not have access to provisioning information associated with a secure element of the mobile device. Without the provisioning information, the issuer cannot provision (or request a provisioning service to provision) the financial account on the mobile device. According to various embodiments, the issuer may request the provisioning information from the mobile device instead of a third party such as a mobile network operator. The issuer may either request the provisioning information from the mobile device and send the provisioning information to a provisioning system, or automatically cause the mobile device to determine/ gather the provisioning information and send the provisioning information directly to the provisioning system.

At step 606, the issuer server computer generates a provisioning information request message to the accountholder's mobile device without interacting with the accountholder. The provisioning information request message may include one or more of an authorization code, an account identifier, the mobile device identifier and a provisioning information request identifier (e.g. a header) that identifies the message to the recipient mobile device as a provisioning information request message. In some embodiments, the provisioning information request message may be encrypted with an issuer provisioning service key or other shared encryption key pair to ensure that the provisioning request may not be intercepted by a malicious third party.

At 608, the issuer may send the provisioning information request message to the mobile device of the user to initiate the provisioning of the payment account on the mobile device. According to various embodiments, the provisioning information request message may be sent using any communication network or communication protocol. For example, the provisioning information request message may include a text message, email, over-the-air (OTA) communication message, or any other message that the mobile device may receive.

III. Exemplary Systems

Provided below is a description of an exemplary system in which embodiments provided herein may be utilized. Although some of the entities and components may be depicted as separate, in some instances, one or more of the components may be combined into a single device or location (and vice versa). Similarly, although certain functionality may be described as being performed by a single entity or component within the system, the functionality may in some instances be performed by multiple components and/or entities (and vice versa). Communication between entities and components may comprise the exchange of data or information using electronic messages and any suitable electronic communication medium and method, as described below. The system may be used to perform a process for using a mobile device with a provisioned account identifier such as a PAN or a payment token. The process for using a mobile device with a provisioned account identifier is discussed subsequently to the discussion of the system.

As used herein, an "issuer" may typically refer to a business entity (e.g., a bank or other financial institution) that maintains financial accounts for the user and often issues a payment device such as a credit or debit card to the user. As used herein, a "merchant" may typically refer to an entity that engages in transactions and can sell goods or services to the user. As used herein, an "acquirer" may typically refer to a business entity (e.g., a commercial bank or financial institution) that has a business relationship with a particular merchant or similar entity. Some entities can perform both issuer and acquirer functions.

An exemplary financial transaction system is shown in FIG. 7. The system 720 may include one or more merchants 722, one or more access devices 734, one or more acquirers 724, and one or more issuers 728. For example, the system 720 may include a merchant having a merchant computer 722 that comprises an external communication interface (e.g. for communicating with an access device 734 and an acquirer 724), system memory comprising one or modules to generate and utilize electronic messages, and a data processor (for facilitating a financial transaction and the exchange of electronic messages); an acquirer having an acquirer computer 724 that comprises an external communication interface (e.g. for communicating with a merchant computer 722 and a payment processing network 726), system memory comprising one or modules to generate and utilize electronic messages, and a data processor (for facilitating a financial transaction and the exchange of electronic messages); and an issuer having an issuer server computer 728 that comprises an external communication interface (e.g. for communicating with a payment processing network 726), system memory comprising one or modules to generate and utilize electronic messages, and a data processor (for facilitating a financial transaction and the exchange of electronic messages). The external communication interface of the merchant computer 722 may be coupled to an access device 734 (such that information may be received by the access device 734 and communicated to the merchant computer 722) or, in some embodiments, the access device 734 may comprise a component of the merchant computer 722.

As used in this context, an "external communication interface" may refer to any hardware and/or software that enables data to be transferred between two or components of system 720 (e.g., between devices residing at locations such as an issuer, acquirer, merchant, payment processing network 726, etc.). Some examples of external communication interfaces may include a modem, a network interface (such as an Ethernet card), a communications port, a Personal Computer Memory Card International Association (PCMCIA) slot and card, or the like. Data transferred via external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components in the system 720 may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format.

As shown in the exemplary system 720 in FIG. 7, payment account information from mobile device 736 may be provided to access device 734, for example, through a contact or contactless interface. In some embodiments, the mobile device 736 may interact with the payment processing network 726 (or other entity in the system 720) via network 740 (such as the Internet).

A payment processing network 726 may be disposed between the acquirer computer 724 and the issuer server computer 728 in the system 720. Furthermore, the merchant computer 722, the acquirer computer 724, the payment processing network 726, and the issuer server computer 728 may all be in operative communication with each other (i.e. although not depicted in FIG. 7, one or more communication channels may exist between each of the entities, whether or not these channels are used in conducting a financial transaction).

The payment processing network 726 may include data processing subsystems, networks, and operations used to support and deliver authorization services, exception file services, and clearing and settlement services. For example, the payment processing network 726 may comprise a server computer, coupled to a network interface (e.g. by an external communication interface), and a database(s) of information. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 726 may use any suitable wired or wireless network, including the Internet.

Although many of the data processing functions and features of some embodiments may be present in the payment processing network 726 (and a server computer therein), it should be understood that such functions and features could be present in other components such as the issuer server computer 728, and need not be present in the payment processing network 726, or a server computer therein.

Using the mobile device 736 (which is provisioned with an account identifier such as a PAN or a payment token), the user may initiate a payment transaction with the merchant computer 722, through the access device 734. An illustrative method for an exemplary financial transaction is described below. The method described below is exemplary in nature, and are not intended to be limiting. Methods in accordance with some embodiments described herein may include (or omit) some or all of the steps described below, and may include steps in a different order than described herein.

A user presents his or her mobile device 736 to the access device 734 to pay for an item or service. The mobile device 736 and the access device 734 interact such that information from the mobile device 736 (e.g. PAN, verification value(s), expiration date, etc.) is received by the access device 734 (e.g. via contact or contactless interface). The merchant computer 722 may then receive this information from the access device 734 via the external communication interface. The merchant computer 722 may then generate an authorization request message that includes the information received from the access device 734 (i.e. information received from the mobile device 736) along with additional transaction information (e.g. a transaction amount, merchant specific information, etc.). The merchant computer 722 may electronically transmit this information to the acquirer computer 724. The acquirer typically represents, and vouches for, the merchant in financial transactions (e.g. credit card transactions). The acquirer computer 724 may then receive (via its external communication interface), process, and forward the authorization request message to the payment processing network 726.

The payment processing network 726 may have an established protocol with each issuer on how the issuer's transactions are to be authorized. In some cases, such as when the transaction amount is below a threshold value, the payment processing network 726 may be configured to authorize the transaction based on information that it has about the user's account without generating and transmitting an authorization request message to the issuer server computer 728. In other cases, such as when the transaction amount is above a threshold value, the payment processing network 726 may receive the authorization request message via its external communication interface, determine the issuer associated with the payment account, and forward the authorization request message for the transaction to the issuer server computer 728 for verification and authorization. As part of the authorization process, the payment processing network 726 or issuer server computer 728 may analyze a verification value or other datum provided by the mobile device 736. The verification value may be stored at issuer server computer 728 or the payment processing network 726. Once the transaction is authorized, the issuer server computer 728 may generate an authorization response message (that may include an authorization code indicating the transaction is approved or declined) and transmit this electronic message via its external communication interface to the payment processing network 726. The payment processing network 726 may then forward the authorization response message via a communication channel to the acquirer computer 724, which in turn may transmit the electronic message to comprising the authorization indication to the merchant computer 722.

The various participants and elements described herein may operate one or more computer apparatuses to facilitate the functions described herein. Any of the elements in the above-described FIGS. 1-7, including any servers or databases, may use any suitable number of subsystems to facilitate the functions described herein.

Figure 8:
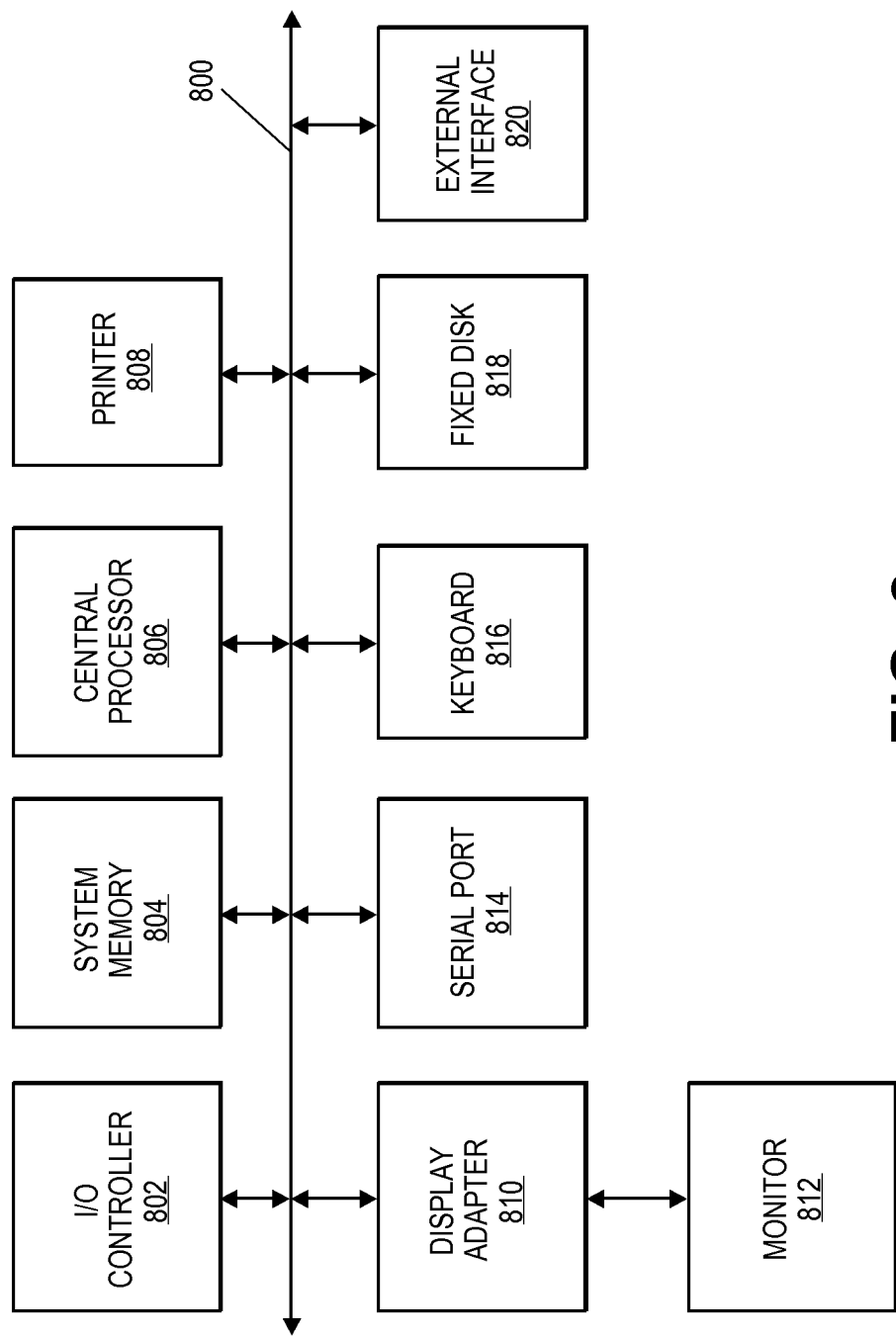
FIG. 8 shows an exemplary computer system according to embodiments of the present invention.

Examples of such subsystems or components are shown in FIG. 8. The subsystems shown in FIG. 8 are interconnected via a system bus 800. Additional subsystems such as a printer 808, keyboard 816, fixed disk 818 (or other memory comprising computer readable media), monitor 812, which is coupled to display adapter 810, and others are shown. Peripherals and input/output (I/O) devices, which couple to I/O controller 802 (which can be a processor or other suitable controller), can be connected to the computer system by any number of means known in the art, such as serial port 814. For example, serial port 814 or external interface 820 can be used to connect the computer apparatus to a wide area network such as the Internet, a mouse input device, or a scanner. The interconnection via system bus 800 allows the central processor 806 to communicate with each subsystem and to control the execution of instructions from system memory 804 or the fixed disk 818, as well as the exchange of information between subsystems. The system memory 804 and/or the fixed disk 818 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a mobile communication device, an information request message from an issuer server computer thereby initiating provisioning of a payment account on the mobile communication device without a user interacting with the mobile communication device, wherein the issuer server computer is associated with an issuer that issued the payment account to the user;
automatically determining, by the mobile communication device, provisioning information associated with a secure memory in response to the information request message and without input of the user operating the mobile communication device;
generating, by the mobile communication device, a provisioning request message including the provisioning information;
sending, by the mobile communication device, the provisioning request message including the provisioning information to a provisioning system or the issuer server computer;
receiving, by the mobile communication device, a provisioning response message including provisioning data from the provisioning system, wherein the provisioning data is generated using the provisioning information associated with the secure memory; and
storing, by the mobile communication device, the provisioning data in the secure memory, wherein the provisioning data associates the mobile communication device with the payment account.

2. The method of claim 1, wherein the provisioning information associated with the secure memory includes one or more of secure domain information, network operator information, user information, trusted service manager information and encryption key information.

3. The method of claim 1, wherein the information request message includes one or more of an authorization code, an account identifier and a mobile device identifier.

4. The method of claim 3, wherein the provisioning request message includes one or more of the authorization code, the account identifier and the mobile device identifier.

5. The method of claim 1, further comprising:
encrypting the provisioning request message prior to sending the provisioning request message to the provisioning system.

6. The method of claim 1 further comprising:
identifying the information request message as a provisioning information request message based on an identifier included in the information request message, and without interacting with the user.

7. The method of claim 1, wherein the provisioning data includes a primary account number or a payment token.

8. A mobile communication device comprising:
a secure memory;
a processor, and a non-transitory computer readable medium coupled to the processor, the computer readable medium comprising code, that when executed by the processor, causes the processor to:

receive an information request message from an issuer server computer thereby initiating provisioning of a payment account on the mobile communication device without a user interacting with the mobile communication device, wherein the issuer server computer is associated with an issuer that issued the payment account to the user;

automatically determine provisioning information associated with the secure memory in response to the information request message and without input of the user operating the mobile communication device;

generate a provisioning request message including the provisioning information;

send the provisioning request message including the provisioning information to a provisioning system or the issuer server computer;

receive a provisioning response message including provisioning data from the provisioning system, wherein the provisioning data is generated using the provisioning information associated with the secure memory; and store the provisioning data in the secure memory, wherein the provisioning data associates the mobile communication device with the payment account.

9. The mobile communication device of claim 8, wherein the provisioning information associated with the secure memory includes one or more of secure domain information, network operator information, user information, trusted service manager information and encryption key information.

10. The mobile communication device of claim 8, wherein the information request message includes one or more of an authorization code, an account identifier and a mobile device identifier.

11. The mobile communication device of claim 10, wherein the provisioning request message includes one or more of the authorization code, the account identifier and the mobile device identifier.

12. The mobile communication device of claim 8, wherein the code, when executed by the processor, further causes the processor to:

encrypt the provisioning request message prior to sending the provisioning request message to the provisioning system or the issuer server computer.

13. The mobile communication device of claim 8, wherein the code, when executed by the processor, further causes the processor to:

identify the information request message as a provisioning information request message based on an identifier included in the information request message without interacting with the user.

14. The mobile communication device of claim 8, wherein the provisioning data includes a primary account number or a payment token.

* * * * *